United States Patent [19]

Redlich et al.

[11] 3,830,968

[45] Aug. 20, 1974

[54] RECORDING OF AUDIO AND VIDEO SIGNALS IN THE SAME TRACK

[75] Inventors: Horst Redlich; Joachim Gluth; Rolf Kossak, all of Berlin, Germany

[73] Assignee: TED Bildplatten Aktiengesellschaft AEG-Telefunken-Teldec, Zug, Switzerland

[22] Filed: Apr. 23, 1973

[21] Appl. No.: 353,767

[30] Foreign Application Priority Data

Apr. 21, 1972 Germany ............................ 2219528

[52] U.S. Cl. .................. 178/6.6 A, 179/100.4 C, 179/100.4 M, 360/19, 360/30

[51] Int. Cl. ........................... H04n 5/76, G11b 3/00

[58] Field of Search ............... 178/6.6 A, 5.6, 5.8 R, 178/5.8 AF; 179/100.2 R, 100.2 MD, 100.4 R, 100.4 C, 100.4 M

[56] References Cited

UNITED STATES PATENTS

| | | | |
|---|---|---|---|
| 3,482,038 | 12/1969 | Warren | 178/6.6 A |
| 3,652,809 | 3/1972 | Dickopp et al. | 179/100.4 R |

*Primary Examiner*—Raymond F. Cardillo
*Attorney, Agent, or Firm*—Spencer & Kaye

[57] ABSTRACT

In the recording of a video signal and an audio signal in a single recording channel, with the recorded signal being a first carrier oscillation frequency modulated with the video information and a second carrier oscillation frequency modulated with the audio information, interferences which might occur in the audio signal as a result of the appearance of certain video signal frequencies are reduced by increasing the amplitude of the audio carrier oscillation whenever such frequencies appear in the video signal.

10 Claims, 2 Drawing Figures

RECORDING OF AUDIO AND VIDEO SIGNALS IN THE SAME TRACK

BACKGROUND OF THE INVENTION

The present invention relates to the recording of television signals, particularly in which a frequency modulated audio carrier and a frequency modulated video carrier are recorded in a single recording channel.

In picture signal recordings, such as a picture record, which have only a single track, the video signal and the audio signal must be recorded on the same track. To this end, it is known to record the video signal by frequency-modulating a video carrier oscillation and the audio signal by frequency-modulating an audio carrier oscillation of a different frequency. With this simultaneous recording of the two signals, there exists the danger of interference between the video signal and the audio signal.

SUMMARY OF THE INVENTION

It is an object of the present invention to reduce such interferences.

The invention is based essentially on the realization that the degree of interference produced in the audio signal by the video signal is mainly dependent on the picture content or the nature of the video information. In many cases, the video information is such that the modulated video signal does not interfere with the audio signal so that the modulated audio carrier oscillation can be recorded with the constant amplitude, which is lower than that of the video carrier. Only in those instances where the video information is high in contrast and resolution do interferences with the audio signal become intolerable.

It has been found that these interferences occur substantially when frequencies are present in the video signal, or in the frequency modulated video carrier oscillation, which are equal to the frequency of the audio carrier oscillation or when such frequencies are produced as a result of nonlinearities in the transmission path.

According to the invention, such interferences are suppressed, in the recording of video and audio signals on a single track, by monitoring the video signal and increasing the amplitude of the audio signal being recorded upon the occurrence of video signal frequencies which would cause interferences in the audio signal. Primarily the interfering frequency is that of the audio carrier and could have a value of the order of 1MHz ± 50KHz.

Figure 1:
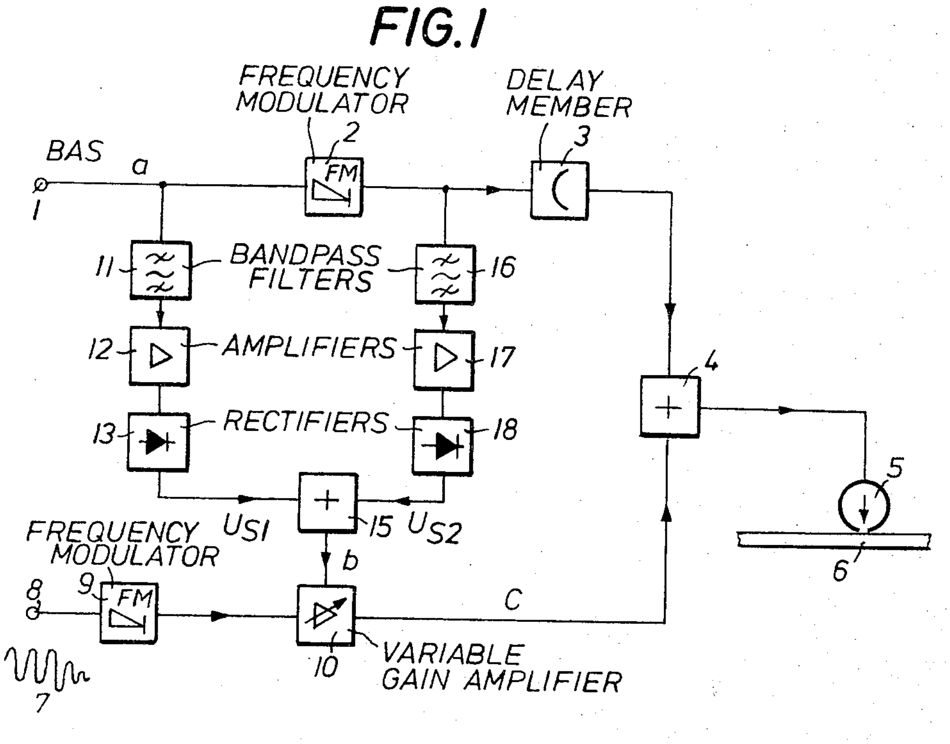
FIG. 1 is a block circuit diagram of a preferred embodiment of the present invention.
Figure 2:
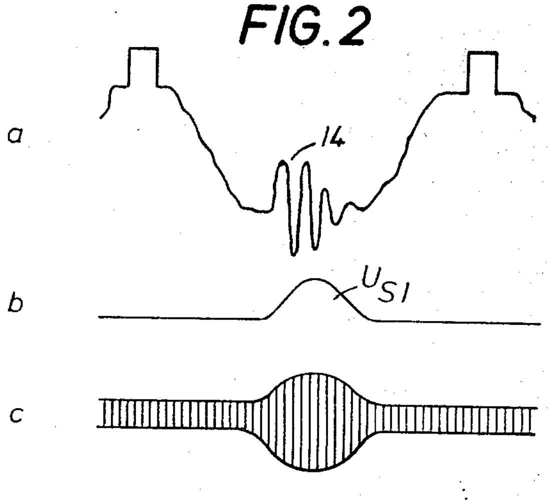
FIG. 2 is a set of curves used to explain the operation of the circuit of FIG. 1.

The lower case letters in the drawings indicate at which points in FIG. 1 the voltage waveforms of FIG. 2 are produced.

DESCRIPTION OF THE PREFERRED EMBODIMENTS

In FIG. 1, as BAS video signal, or composite video signal, with a bandwidth of about 5 MHz is transmitted from a terminal 1 to a frequency modulator 2 in which a video carrier oscillation frequency-modulated with the video information is produced. This modulated carrier oscillation passes through a delay member 3 and a linear adding stage 4 to a recording head 5. The recording head records the modulated video carrier oscillation on a record carrier 6, e.g. a picture record, with a reduced bandwidth of about 3–4 MHz.

An audio signal 7 is transmitted from a terminal 8 to a frequency modulator 9 which produces an audio carrier oscillation modulated with the audio signal and with a frequency of about 1 MHz ± 50 KHz. This modulated audio carrier oscillation passes through a variable gain amplifier 10, the output signal, *c*, from amplifier 10 is supplied to the adder stage 4 and is also recorded on the record carrier 6.

The recording is preferably made in a manner suited for the pressure scanning principle, as disclosed in German Pat. No. 1,574,489 and in U.S. Pat. No. 3,652,809 issued on Feb. 12, 1969.

The modulated video carrier oscillation occupies a frequency range of about 0–8 MHz. Therefore, a frequency of about 1 MHz can appear in the video signal as well as in the modulated video carrier oscillation, depending on the picture content, which frequency coincides with the frequency of the audio carrier oscillation and would cause interference with the audio signal during playback.

According to the present invention, a portion of the video signal, *a*, is fed to a bandpass filter 11 whose pass band is set to the audio carrier frequency of about 1 MHz ± 50 KHz. As soon as a frequency of about 1 MHz appears in the video signal *z*, which frequency is marked 14 in waveform a of FIG. 2, which would cause interference in the audio a, during playback, an alternating voltage at this frequency appears at the output of filter 11. This alternating voltage is amplified in an amplifier 12 and rectified in a rectifier 13. This results in the production of a setting value $U_{s1}$, represented by waveform *b* in FIG. 2, which acts on the gain control input of amplifier 10, through adder stage 15, and increases its gain. Thus the amplitude of the recorded audio carrier *c* is increased during the occurrence of the interfering frequency 14 so that the interference in the audio signal due to the video signal is reduced during playback.

A portion of the video carrier oscillation produced in modulator 2 is fed to a bandpass filter 16 to which are connected an amplifier 17 and a rectifier 18. Filter 16 also has a pass band set to the audio carrier frequency of 1 MHz ± 50 KHz. This produces a setting value $U_{s2}$ which is added to setting value $U_{s1}$ in adder stage 15. The frequency of about 1 MHz in the video signal which produces the interference during the audio playback is thus monitored twice, once in the video signal itself and once in the FM video carrier oscillation.

If no frequency of about 1 MHz occurs in either the original video signal, *a*, or in the FM video carrier oscillation to interfere with the audio signal during playback, filters 11 and 16 do not pass a signal so that no setting value *b* appears. The amplitude of the modulated audio carrier oscillation, *c*, then has a constant value which is much lower than the amplitude of the video carrier oscillation, as shown for curve *c* in FIG. 2, to the left and right of the amplitude rise.

The delay member 3 serves to permit the increase in amplitude of the audio carrier to take place at the proper time, if required even before the point at which the interfering frequency 14 begins to appear at adder 4. The setting value then becomes effective in amplifier 10 before the interfering frequencies 14, which actuate the setting value, appear at the upper input of the adder stage 4. The delay member 3 is an ultrasonic delay line, for example.

It occurs that the temporary increase in amplitude of the modulated audio carrier oscillation increases the possibility of an interference in the video signal by the audio signal. Since, however, the frequency which interferes in the audio signal, and thus the increase in amplitude in the audio carrier oscillation, occurs in conjunction with pictures containing strong contrasts, e.g. those containing black and white script, the rise in amplitude of the audio carrier oscillation does not have an adverse effect on the picture quality.

In an advantageous manner the amplitude of the audio carrier oscillation is thus dynamically increased only when it is advisable to reduce interferences in the audio signal and when no visible interference will as a result appear in the picture in spite of the increase in audio signal amplitude. The amplitude of the recorded audio carrier oscillation is thus controlled in an advantageous manner to achieve interference-free playback of the audio and video signals in dependence on the existing video information. When the audio signal is played back, the dynamic change in the amplitude of the audio carrier oscillation does not interfere because oscillation is limited in amplitude before it is demodulated.

In the case of an operationally required reduction in amplitude of the audio carrier oscillation to 30 db below the amplitude of the video carrier oscillation, the dynamic increase in the amplitude of the audio carrier oscillation according to the present invention can rise to a maximum of 20 db to 15 db below the amplitude of the video carrier oscillation.

If necessary, the circuit according to the present invention can be used to monitor, in addition to the frequency of the audio carrier oscillation in the picture signal, other frequencies which interfere with the audio playback and which have been determined either by computation or empirically, for example, and can be used to increase the amplitude of the audio carrier oscillation upon the occurrence of such frequencies.

It will be understood that the above description of the present invention is susceptible to various modifications, changes and adaptations, and the same are intended to be comprehended within the meaning and range of equivalents of the appended claims.

We claim:

1. In a system for recording, on a single track of a recording carrier, a video signal and an associated audio signal, the video signal being formed in a video processing channel in which a video carrier oscillation is frequency modulated with the video information and the audio signal being formed in an audio processing channel in which an audio carrier oscillation is frequency modulated with the audio information, the audio carrier oscillation having a frequency different from that of the video carrier oscillation and an amplitude less than that of the video carrier oscillation, the improvement comprising: means connected to monitor the frequencies in the video processing channel; and means connected to be controlled by said monitoring means for increasing the amplitude of the audio carrier oscillation being recorded upon receipt by said monitoring means of a predetermined frequency value which would cause interference with the audio information during playback, whereby the severity of such interference is at least reduced.

2. An arrangement as defined in claim 1 wherein said monitoring means are connected to the video processing channel to monitor the frequencies of the video information before it is applied to frequency modulate the video carrier oscillation.

3. An arrangement as defined in claim 1 wherein said monitoring means are connected to said video processing channel to monitor the frequency of the frequency modulated video carrier oscillation.

4. An arrangement as defined in claim 1 wherein the amplitude of said audio carrier oscillation is normally 30 db below that of said video carrier oscillation and said means for increasing the amplitude of the audio carrier oscillation act to increase the amplitude thereof to a value of 15–20 db below that of the video carrier oscillation.

5. An arrangement as defined in claim 1 wherein the frequency value is that of the audio carrier oscillation.

6. An arrangement as defined in claim 5 wherein the frequency of the audio carrier oscillation is of the order of 1 MHz ± 50 KHz.

7. An arrangement as defined in claim 1 wherein said monitoring means comprise: filter means connected to receive the frequencies being monitored and adjusted to respond to the predetermined frequency; rectifier means connected to the output of said filter means for rectifying the response signal from said filter means; and setting value means connected between the output of said rectifier means and said audio processing channel for varying the amplitude of the audio carrier oscillation in depependence dependence the response signal from said filter means.

8. An arrangement as defined in claim 7 wherein said filter means comprises two filters each adjusted to respond to the predetermined frequency and connected to receive, respectively, the video information prior to frequency modulation of the video carrier oscillation and the frequency modulated video carrier oscillation; said rectifier means include two rectifiers each connected to the output of a respective filter; and said setting value means are connected to the output of both said rectifiers for producing a setting value corresponding to a combination of the responses of said two filters.

9. An arrangement as defined in claim 1 wherein said processing channels are arranged to process the signals therein in such a manner as to cause the audio carrier oscillation arriving at the carrier to have an increased value before the arrival at the carrier of the video signal portion causing such increased audio carrier oscillation amplitude.

10. An arrangement as defined in claim 9 wherein said video processing channel comprises a delay member connected between the connection of said monitoring means to said channel and the output of said channel for delaying the video signal by an amount sufficient to permit a portion of the audio carrier oscillation having an increased amplitude to arrive at the carrier before the portion of the video signal which resulted in such increased amplitude.

* * * * *